United States Patent [19]

Howanietz et al.

[11] 4,340,510

[45] Jul. 20, 1982

[54] CONCRETE MIXTURES OR MORTAR MIXTURES OR CONCRETES OR MORTARS AND PROCESS FOR THEIR PRODUCTION

[76] Inventors: Friedrich Howanietz, Penzingerstrasse 20, A-1140 Vienna; Alexander Kozlowski, Mariahilferstrasse 106/9, A-1070 Vienna, both of Austria

[21] Appl. No.: 973,663

[22] Filed: Dec. 27, 1978

[30] Foreign Application Priority Data

Dec. 30, 1977 [AT] Austria .................................. 9436/77

[51] Int. Cl.³ ............................................... C08L 1/00
[52] U.S. Cl. ......................................... 260/8; 156/337; 428/446; 521/54; 521/55; 523/218; 523/205
[58] Field of Search .............. 521/54, 55; 260/28.5 A, 260/42.13, 28.5 R, 8, 29.6 S, 29.7 S, 17.5, 17.4 R, 17.4 CL

[56] References Cited

U.S. PATENT DOCUMENTS

| | | | |
|---|---|---|---|
| 3,214,393 | 10/1965 | Sefton | 521/55 |
| 3,247,294 | 4/1966 | Gabouni | 521/55 |
| 3,272,765 | 9/1966 | Sefton | 521/55 |
| 3,764,357 | 10/1973 | Bowles et al. | 521/55 |
| 3,795,653 | 3/1974 | Aignesberger et al. | 521/54 |
| 3,819,565 | 6/1974 | Yosina et al. | 260/42.13 |
| 3,869,295 | 3/1975 | Bowels et al. | 521/55 |
| 3,899,455 | 8/1975 | Unterstenhoefer et al. | 521/54 |
| 4,010,134 | 3/1977 | Braunisch et al. | 260/42.13 |
| 4,057,526 | 11/1977 | deRook | 260/42.13 |
| 4,086,201 | 4/1978 | Peters et al. | 260/42.13 |
| 4,137,198 | 1/1979 | Socks | 260/42.13 |

*Primary Examiner*—Morton Foelak
*Attorney, Agent, or Firm*—Beveridge, DeGrandi & Kline

[57] ABSTRACT

A concrete or mortar mixture or concrete or mortar on the basis of hydraulic binders and plastic materials for the production of building elements or coatings insensitive to shock and impact stress, abrasion, frost-thaw and defrosting salt and chemical attack as well as for effecting repair work on building elements or coatings, wherein lime or cement selected from the group consisting of Portland cement of conventional composition, iron Portland cement, blast furnace cement, flue ash Portland cement, Ciment composé, puzzolane cement, high-alumina cement, modified Portland cement on the basis of $11CaO.7Al_2O_3.CaF_2$, Brunauer cement, Grenoble cement and Roman cement and further at least one liquid-dispersed or dissolved plastic material selected from the group consisting of pure polymerizates, mixed polymerizates, and co-polymerizates, the plastic material having low-temperature adhesiveness and a $T_{max}$ value of less than $-8°$ C. determined according to DIN 53445, are contained.

29 Claims, No Drawings

CONCRETE MIXTURES OR MORTAR MIXTURES OR CONCRETES OR MORTARS AND PROCESS FOR THEIR PRODUCTION

The invention relates to concrete mixture or mortar mixtures or concrete or mortar on the basis of hydraulic binders and plastic materials, a process for their production and to such mixtures bonded to connecting layers.

It is known that during the past decades, the addition of plstic materials in the production of concrete has repeatedly been tried and put into practice. But such additives or aggregates reduce the initial strengths and impair the mechanical properties of the concrete when the plastic materials are added to the fresh concrete and not as a post treatment of the concrete after setting. These shortcomings could not be overcome by the most recent inventions and practical experience. The slow setting of concretes containing plastic materials also limits their field of application.

It is further known to employ mixtures of cement and plastic material dispersions and, optionally, bitumen emulsions, for instance for the preparation of concrete or for repairing damaged concrete surfaces. The application of such mixtures in closed rooms under ambient climatic conditions yields satisfactory results. Quite different are experiences made in all those fields of construction work where coatings, plasters, bulding elements or the like are exposed to major temperature fluctuations and in particular to temperatures below 0° C. This holds particularly true for horizontally applied coatings such as concrete roadway surfaces which, due to salt scattering, are often exposed to extremely low temperatures, but still to retain their full capacity. Independent of temperature fluctuations and low temperatures, concretes on the basis of cement and plastic materials which have been used up to now, even if the binder mixture contains additional bitumina, show low elasticity and inadequate toughness and, due to their brittleness, comparatively high sensitivity to shock or impact stress, for instance due to heavy traffic, and comparatively high abrasion, for instance due to spike tires.

These properties of known binders on the basis of cement and plastic materials show adverse effects in newly applied coatings and newly produced building elements and particularly in repair work, for instance in roadway surfaces, bridges or the like, wherein interfaces between old and fresh concrete are created.

It has further been attempted again and again to produce concretes possessing all the advantages of mastic asphalts, but none of their disadvantages and drawbacks. The preparation of conretes or mortars showing elastoplastic behavior has also been attempted, but in this case, as well, the known concretes or mortars containing conventional additives or aggregates in the form of plastic materials and/or bitumen do not come up to requirements. Moreover, in recent years the problem of repair and restoration of roadway surfaces damaged by the extensive use of spike tires has become of ever increasing importance. Added to those previously mentioned must be the requirement of making the coatings ready for use as quickly as possible after repairs.

Object of the invention is the provision of a concrete mixture or mortar mixture on the basis of cement, plastic material and optionally bitumen suitable for the production of concretes or mortars which are free of the disadvantages mentioned within a wide temperature range and less sensitive to shock and impact stress, abrasion and frequent frost-thaw than all known concretes or mortars and show essentially better elastic behavior than the known concretes or mortars at temperatures below 0° C. Moreover, the new concrete mixture or mortar mixture yields concretes or mortars which are insensitive to the simultaneous effect of frost-thaw and defrosting salt and in particular also prevent permeation of defrosting salt solutions into the concrete or mortar. Preventing the permeation of defrosting salt solutions is particularly important for the protection of steel reinforcements such as construction steel grids embedded in concrete, but also for protecting steel girders or steel plates positioned below a concrete surface, such as those of bridges and the like, against corrosion.

It was found in the course of extensive investigations that concretes or mortars on cement basis containing plastic materials of selected low-temperature properties and, optionally, bitumen, tar and additional particles or form bodies of organic materials, are free of the disadvantages mentioned and come up to the aforementioned requirements much better than all concretes containing plastic material additives or aggregates known up to now.

Object of the present invention is thus a concrete mixture or mortar mixture or concrete or mortar on the basis of hydraulic binders such as cement, plastic material and optionally bitumen, and optionally aggregates, in particular for the production of building elements and/or coatings insensitive to impact or shock stress, abrasion, frost-thaw, the effect of defrosting salt, frost and chemical attack by chloride, sulfate, $SO_2$ and the like, as well as for effecting repair work on these building elements and/or coatings which is (are) characterized in that it (they) contain(s) at least one inorganic binder, in particular hydraulic lime and/or cement, for instance Portland cement of conventional composition, iron Portland cement, blast furnace cement, flue ash Portland cement, Ciment compose, puzzolane cement, high-alumina cement, modified Portland cement on the basis of $11CaO.7Al_2O_3.CaF_2$, Brunauer cement, Grenoble cement and/or Roman cement, further at least one plastic material of low $T_{max}$ value preferably present in liquid-dispersed or dissolved form, preferably a plastic material having a $T_{max}$ value of less than $-8°$ C. determined according to Standard DIN 53445. ("DIN" stands for "Deutsche Industrie Norm", which can be translated into English as "German Industrial Standard".) The mixture optionally contains bitumen and/or tar in ground, dry-dispersed, liquid-dispersed and/or dissolved form in addition to the components previously mentioned. In this case, it is preferable that at least a portion of the aggregates consist of particles or form bodies of organic material, in particular of plastic material. The remaining portion may then consist of conventional aggregates.

The concrete mixtures or mortar mixtures or concretes or mortars prepared in the composition according to the invention possess excellent adhesive strength on any given substrate which may be a building element or coating on the basis of concrete and/or bitumen, but also metal, such as steel plates or the like, and are highly resistant to chemically aggressive substances, so that they constitute valuable protection for steel reinforcements or steel girders in concrete against any type of corrosion from the outside.

The combinations according to the invention of components in the concrete or mortar mixture yield concretes and mortars of outstanding adhesive strength on any given substrate and excellent shock and impact-damping properties. Mechanical stress on building elements prepared from concrete mixtures or mortar mixtures according to the invention by temperature fluctuations or frost, for instance if moisture should penetrate into the fresh concrete and freeze there, and the frequently accompanying bursting or peeling off the substrate due to volume increase will not impair the adhesive strength, so that pressing on, for instance by wheel load, after thawing will restore the full connection to the substrate.

Coatings prepared from concrete or mortar mixtures according to the invention as a further advantage are free of brittleness and show an essentially elastoplastic behavior. The new concrete mixtures or mortar mixtures are thus particularly suitable for the restoration and repair not only of concrete building elements and coatings, in particular old, much used and damaged concrete objects, but also for the preparation of elastoplastic coatings such as asphalt surfaces.

The building elements and coatings prepared from the concrete or mortar mixtures according to the invention assure elastic ductility at simutaneous high stability, the service life of such coatings as compared to known and conventional ones is essentially improved by the elimination of brittleness.

Moreover, the concrete or mortar mixtures according to the invention and, ultimately, the concretes or mortars prepared therefrom, are characterized by excellent adhesive strength on various substrates such as concrete and bituminous substrates, so that they are eminently suitable for assanation work of all types. In addition to the favorable behavior of the finished coating when using rapid-setting cements, such as those on the basis of $11CaO.7Al_2O_3.CaF_2$, rapid re-use after preparation becomes possible. The coatings produced from the new concrete mixtures are excellently suited for employment in roads, bridges, parking lots, entrances and athletic fields, but their application is also very promising for indoor floors.

Fields of application of the concrete mixtures or mortar mixtures or concretes or mortars prepared therefrom according to the invention are thus underground construction work and building above ground, where they excel, as experience has shown, by high resistance to all types of chemical substances such as chemically aggressive solutions, above all the effect of defrosting salt at simultaneous high frost-thaw stress, to mineral oils and their derivatives and to chemically aggressive gases such as $SO_2$. They are moreover outstandingly resistant to abrasion and mechanical stress.

A further essential advantage of the mixtures according to the invention resides in the fact that their preparation can be precisely controlled so as to endow them with all the favorable properties of mastic asphalts, while they are still far superior to those in respect of stability under the influence of higher temperatures.

The new concrete mixtures or mortar mixtures or concretes or mortars close a gap which existed up to now, for instance in the field of road construction, in respect of the restoration of concrete road surfaces.

Concerning their temperature behavior, the concrete mixtures or mortar mixtures according to the invention and the concretes and mortars prepared therefrom are less thermoplastic than mastic asphalts and essentially less sensitive than asphalt or bitumen coatings prepared from a unigranular structure which are subsequently compacted by washing or brushing in cement and/or plastic material dispersions.

The selection of the proportion of aggregages of an organic nature, i.e. particles or organic material, further provided for according to the invention, and the nature of the respective plastic material employed and of the optionally used bitumina and/or coal tars in the concrete mixture, permit a very precise adjustment to desired elastoplastic properties of the concretes or mortars prepared therefrom.

In explanation of the plastic material having low-temperature adhesiveness contained in the mixture according to the invention, it should be mentioned that the $T_{max}$ value of a plastic material is understood to mean that temperature at which this plastic material shows or passes the maximum value of the logarithmic decrement of torsional oscillation damping at testing according to Standard DIN 53445. Determination of the $T_{max}$ value is described, for instance, in the company publication "Acrylharzdispersionen, Röhm", Item 5, pages 9, 10 (undated).

Tests have shown that the use of plastic materials of low $T_{max}$ value of less than $-8°$ C. as provided according to the invention results in an elasticity which is determining for improved service life of concretes and mortars and manifests itself in a strongly damping effect at shock or impact stress. It was further found that in repair work, much lower tensions in the interfaces of old and fresh concrete occur. These tensions are caused by elimination of the hydraulic binder at hydration and by changes in length due to temperature changes.

If the concrete mixture on the basis of cement, plastic material and optionally bitumen used up to now were reasonably useful at room temperature and above, the mixtures according to the invention permit the preparation of coatings and building elements which retain their elasticity even at temperatures of less than $0°$ C. and lower, depending upon the selection of the plastic material employed, in particular upon the $T_{max}$ value of this material, and are thus insensitive to stress due to shock, impact, abrasion and frost-thaw.

It was moreover found that the mixture according to the invention are insensitive to the simultaneous effect of frost and defrosting salt and hardly permeable for the chemically aggressive solutions thus formed, so that coatings prepared from those mixtures, in particular even in those cases where they are applied to old concrete, constitute an excellent protection against corrosion for steel reinforcements embedded in concrete, steel girders and the like.

According to the invention, the following, by no means limiting embodiments of the concrete mixtures or mortar mixture or concrete or mortars are provided.

The $T_{max}$ value of the plastic material contained in the mixture is selected depending upon the intended use and the elasticity desired at room temperature. Plastic materials having $T_{max}$ values of less than $-8°$ C. are advantageously used for the preparation of coatings in closed, but unheated rooms, for instance for coatings in garages, halls or the like.

When the concretes or mortars are needed for building elements and coatings which are not subjected to the effect of scattered defrosting salt at low tempratures, i.e. do not have to withstand extremely low temperatures, the addition of a plastic material having a $T_{max}$ value of less than $-15°$ C. has proven advantageous.

For coatings and building elements which are exposed to extremely low temperature due to defrosting salt scattering and lowering of the freezing point, it is appropriate to employ a plastic material having a $T_{max}$ value of less than $-36°$ C.

The concrete mixture and mortar mixtures according to the invention yield concretes and mortars containing as one of their essential components the plastic materials having low $T_{max}$ values and particles or form bodies of organic material optionally added according to the invention and not showing the shortcomings observed up to now, such as splintering at shock or impact stress and embrittling of the concretes at low temperatures, since the original elasticity is retained, due to the plastic material having the selected $T_{max}$ value, throughout the entire desired temperature range without noticeable changes and is supported and even enhanced by the particles or form bodies of organic material, consisting for instance of fibers and/or hollow micro bodies, forming at least a portion of the aggregates present.

It was further surprisingly found that at normal temperatures, the required elasticity can be attained by the addition of essentially lower amounts of plastic materials if these have a $T_{max}$ value of less than $-8°$ C., in particular of less than $-15°$ C., than would be the case with mixtures containing conventional plastic materials having higher $T_{max}$ values.

The savings, for instance when using plastic materials having a $T_{max}$ value of less than $-15°$ C., as compared to those having conventional $T_{max}$ values, have proven to amount to about 40 percent and can be further essentially increased by employing plastic materials of even lower $T_{max}$ values in the binder mixture.

The mixture according to the invention can contain the most diverse classes of plastic materials, such as pure polymerisates, but also mixed and co-polymerisates, providing they come up to the criterium of a $T_{max}$ value which is lower than the $T_{max}$ values each previously indicated for the respective purpose. Examples for such plastic materials are acrylic resins, pure acylic resins, such as synthetic acrylic monomers or methacrylic monomers, acrylic resin copolymers, polyacrylates, acrylic acid esters, styrene-butadiene resins, butadiene resins, polyvinyl esters such as polyvinyl acetate or polyvinyl chloride, polyvinyl propionate or compolymers or mixtures of the resins enumerated.

The low $T_{max}$ value can be obtained in the preparation of the plastic materials particularly by interrupting the polymerisation at a certain, limited chain length. This has the advantage that these resins are substantially not more expensive than those employed in concrete mixtures commercially available up to now. The $T_{max}$ value can also be lowered by the addition of plasticizers, but this type of plastic material is not always suitable for the purposes mentioned above, as the plasticizers may be eliminated in the course of time.

Concerning the amounts of plastic materials to be employed in the mixtures according to the invention, it was found advantageous to use the mixtures containing plastic materials in amounts of 2 to 75 percent by mass, preferably 3 to 35, particularly preferred 5 to 20 percent by mass based on the amount of inorganic binder, for instance cement or lime.

The amount of bitumen and/or tar in the mixture advantageously ranges between 0.5 to 65 percent by weight, in particular 0.5 to 25 percent by weight, particularly preferred 1 to 6 percent by weight, each based on the amount of inorganic binder, e.g. cement or lime.

It was found that particular attention is to be paid to the aggregate of which, if it is present, the invention provides for at least a portion to consist of organic particles or organic form bodies, in particular those consisting of plastic materials.

It addition to other embodiments of the invention not to be discussed in detail, it was further found advantageous to provide for at least a portion of the aggregates to consist of fibers, preferably fibers of plastic materials, in particular fibers of a thickness of 1 to 100 $\mu$m, preferably 2 to 70 $\mu$m, and lengths of 0.2 to 50 mm, preferably 0.4 to 35 mm, particularly preferred 2 to 15 mm.

Due to their elongated structure and strength, the fibers endow the concretes with greater toughness and resistance to shock and impact stress, and, combined with the plastic materials of low $T_{max}$ value, the addition of fibers results in concretes or mortars simultaneously having good low-temperature stability.

A further, most advantageous variant of the mixtures according to the invention previously and subsequently described provides for at least a portion of the aggregates to consist of gas-filled, preferably air-filled, hollow micro bodies preferably having the shape of hollow spheres, i.e. preferably spheric micro capsules of plastic material, in particular those of a diameter of 2 to 150 $\mu$m, preferably of 5 to 100 $\mu$m.

It goes without saying that good results can also be obtained by employing mixtures of the fibers and micro capsules mentioned in any given ratio.

The addition of hollow micro capsules or micro bodies of plastic material results in an essentially improved stability to temperature, frost-thaw and defrosting salt and shock and impact strength in the concretes prepared from the concrete mixtures according to the invention. The effect of the hollow globules is comparable to that of "spherographite" in cast iron. They can also replace a portion or all of the air pores which are required in concretes for increasing their stability to frost-thaw or defrosting salt and are obtained in conventional concretes by the addition of air entraining agents.

The fibers provided as aggregates favorably consist of cotton, cellulose wool, sisal, polyamide, polyacrylic nitrile, polyesters, polyvinyl acetate, polyvinyl propionate, polyvinyl chloride, styrene-butadiene resins, polystyrene, polyurethane, methacrylic acid esters, acrylic resins, acrylic copolymers or the like. Preferred forms are fiber powders, cut filaments or fibers, short staple fibers, fabric chips, felt chips or grinding flock ("Mahlflock"). But it is also possible to add the fibers not individually, but in the form of "sets" or "units", which might be used for controlling the final properties of the concretes.

The hollow micro bodies provided as aggregates preferably consist of polyvinyl acetate, polyvinyl propionate, polyvinyl chloride, styrene-butadiene resins, polystyrene, polyurethane, methacrylic acid esters, acrylic resins, acrylic copolymers, polyamide, polyesters or the like. They are obtained by expanding plastic materials, for instance polystyrene, and are commercially available. It has proven advantageous to use the fibers in amounts of 0.2 to 35 percent by weight, preferably 1 to 25 percent by weight, particularly preferred 2 to 10 percent by weight, each based on the amount of inorganic binder such as cement and/or lime.

The microhollow bodies preferably are contained in amounts of 0.5–35 percent by volume, more preferably of 1 to 25 percent by volume most preferably of 2 to 10 percent by volume each based on the volume of the fresh concrete or mortar mixture.

In some cases, it is of advantage for controlling the preoperties of the concrete to replace a portion, in particular 0.1 to 70 percent by weight, of the organic fibers and/or hollow micro bodies by particles of optionally foamed plastic material of dimensions of 0.1 to 50 mm, preferably 0.1 to 32 mm, in particular 0.1 to 8 mm, which allows for a non-polluting recycling of plastic material scrap.

It may further be of advantage to provide for the concrete mixture or mortar mixture to contain, in addition to cement and plastic material and optionally particles or form bodies of organic material and optionally bitumen or tar, additives and aggregates regulating the properties of the concrete or mortar, preferably (a) substances reducing the amount of mixing water, at equal processibility of the concrete mixture or mortar mixture, for instance cation-active agents, anion-active agents, non-ionogenic wetting agents and/or melamine resins or the salts and the derivatives thereof or sulfite waste liquors and/or (b) substances changing the setting rate and/or hardening of the mixture, such as gluconates, phosphates, citrates, tartaric acid, succinic acid, succinates, alkali metal carbonates, silicofluorides, aluminates, alkali metal or alkaline earth metal halides and/or (c) substances entraining micro air pores, such as natural vinsol resins or synthetic air entraining agents, for instance synthetic soaps or carboxylates.

The preparation of the concrete mixtures or mortar mixtures can be effected in any given manner, i.e. the sequence of addition of the binder components can be selected as desired.

It was found that a particularly favorable behavior of the finished concrete or mortar can be achieved by mixing, in particular covering, the aggregates and additives including the organic particles or form bodies used in the preparation of the binder, in particular concrete or mortar, first with a portion, preferably 30 to 70 percent by weight, in particular about 50 percent by weight, of the plastic material in the dissolved and/or dispersed state, then admixing the entire amount of inorganic binder substances and finally adding the respective remaining portion of plastic material and optionally the desired amount of water.

If the binder additionally contains bitumen, it is of advantage to mix, in particular cover, the aggregates with at least a portion, preferably 3 to 100 percent by weight, in particular 70 to 100 percent by weight, of bitumen and/or tar and optionally a portion, preferably 30 to 70 percent by weight, in particular about 50 percent by weight, of the plastic material, then add the entire amount of inorganic binder substances and finally add the respective portion or the entire amount of plastic material and optionally the remaining portion of bitumen and/or tar and optionally the desired amount of water.

But it would of course also be possible to proceed by covering only the optionally present inorganic portion of the aggregates, for instance sand, split gravel, round grain, rock or the like, with the plastic material of low $T_{max}$ value and optionally with the bitumen and/or tar and to add the organic particles of the aggregate, for instance fibers and/or hollow micro bodies, with the entire amount of inorganic binder substances.

A further variant consists in covering at least a portion of the optionally provided inorganic aggregates and only a portion, preferably 2 to 70 percent by weight, in particular 5 to 50 percent by weight, of the organic particles with the plastic material provided according to the invention and optionally bitumen or, if no inorganic aggregates are provided, only the portion consisting of organic particles and adding the remainder of the organic particles with the entire amount of inorganic binder substances, and finally adding the respective remaining portion or the entire amount of plastic material and optionally the remaining portion of bitumen and/or tar and optionally the desired amount of water.

It turned out in the course of the tests carried out that the advantageous properties of the concrete mixtures or mortar mixtures according to the invention and of the concretes or mortars prepared therefrom can be further essentially improved, particularly in respect to a connection to a substrate, by combining them with a substance imparting adhesiveness, for instance applying the mixtures to the substance imparting adhesiveness, so that it is this substance which actually effects the adhesion to the respective substrate.

Particularly for the production of building elements, such as stressed and non-stressed prefabricated parts for horizontal or vertical assembly, in sandwich-type construction, with the prefabricated parts assembled of concretes of different properties, such as insulating concrete, light-weight concrete or heavy concrete, or of indoor floors and coatings, in particular for athletic fields, traffic surfaces, roadways, pavements, bridges, parking lots or the like, and for further increasing the adhesive force on a substrate and an essentially improved resistance to shock or impact stress, abrasion, frost-thaw, frost and defrosting salt and chemical attack by e.g. chloride, sulfate or $SO_2$, it has proven particularly advantageous to connect the concrete mixtures or mortar mixtures previously described in detail with a connecting layer or layer imparting adhesiveness on the basis of finely divided bitumen, at least one finely divided plastic material and optionally fillers preferably having a particle size up to 4 mm, said connecting layer being arranged below the concrete mixtures or mortar mixtures according to the invention and optionally containing, in addition to the optionally present fillers and to the finely divided bitumen, a hydraulic binder such as cement or lime, at least a portion of the finely divided plastic materials having low-temperature adhesiveness and a $T_{max}$ value of less than $-8°$ C. determined by DIN 53445, in particular of less than $-15°$ C., preferably less than $-36°$ C. This yields a preferably two-layered coating which, as previously mentioned, possesses all the favorable properties indicated above in essentially improved form.

The connection with the layer imparting adhesiveness particularly brings about an essential improvement in the stability of concretes to perme-ation of salt solutions and thus offers excellent protection against corrosion of the steel reinforcements and steel inserts embedded in building elements and coatings and girder constructions of bridges or the like. This two-layer coating will not peel off even when applied to old concrete which was not previously cleaned or roughened, it will stay fast even under the influence of extreme temperature fluctuations and shock and impact stress. The combination of mixture according to the invention and layer imparting adhesiveness allows for an optimal compensation between layers of different concrete properties, such as insulating concrete, light-weight concrete and heavy concrete, so that it is also particularly suitable for application in the original production of prefabricated parts of sandwich-type construction.

Preferred is a combination of the mixture according to the invention with a connecting layer or layer imparting adhesiveness which, depending upon the desired impact or shock damping behavior, has a thickness in the dry state of 0.1 to 4 mm.

The connecting layer itself possesses outstanding adhesive strength on its substrate and high resistance to chemically aggressive liquors, solutions and gaseous substances.

The combinations of bitumen and plastic materials present in the connecting layer possess excellent adhesion and outstanding impact and shock damping properties.

Moreover, the connecting layer has the enormous advantage that it may be applied in a cold state. But it can also be applied in a hot state.

Particular object of the connecting layer provided in the assembly according to the invention is not to form a covering or protecting layer and not an adhesion layer for coatings purely on a bitumen basis, instead, it is to solve the longstanding problem to restore an old concrete surface or an old asphalt surface heavily damaged by spike tires, extremely heavy traffic and/or frost-thaw by means of a concrete on the basis of the previously described concrete mixtures or mortar mixtures according to the invention, that is, to repair and restore them by means of this concrete and not by means of bitumen. The combination according to the invention offers four major advantages:

(1) Fresh concrete according to the invention and old concrete possess excellent adhesion on one another due to their connection by means of the layer imparting adhesiveness, which makes for an ideal "dovetailing" of the layers with one another, which is indispensable for a roadway surface and the stresses it is exposed to.

(2) The concrete mixture to be applied is advantageously of the rapid-setting type and quickly attains high strengths, so that repair work will impede traffic for the shortest periods possible.

(3) The connecting layer, although moist fresh concrete mixtures according to the invention are applied to it, effects the desired intimate connection of the concrete to the connecting layer and the connecting layer effects the same intimate connection between itself and the substrate.

(4) The assembly of layer imparting adhesiveness and fresh concrete mixture according to the invention will withstand heaviest stresses for years after repair and endure extreme temperature fluctuations, frost-thaw, the effect of defrosting salt and stability at extremely low temperatures caused by the scattering of defrosting salt.

The invention further relates to a process for the preparation of the connecting layer which is characterized in that the bitumina are employed in the form of, preferably aqueous, emulsions and the plastic material is employed in the form of, preferably aqueous, dispersions.

The bitumen emulsion employed for the preparation of the layer imparting adhesiveness present in the combination can be of an anionic, cationic and/or non-ionogenic nature; it is preferable to employ anionic bitumen emulsions.

Based on the entire amount of bitumen emulsion and plastic material dispersion employed, the amount of bitumen emulsion advantageously ranges between 99 to 1 percent by weight and the amount of plastic material dispersion between 1 to 99 percent by weight each based on the solid portions of the entire amount of bitumina and plastic materials. The ratio of the sum of the solid portions of the bitumina emulsions and of the plastic material dispersions to the sum of the solids of the fillers and the optionally present hydraulic binders preferably ranges between 10:90 to 90:10.

When employing cationic bitumen emulsions, the ratio of solid portions of plastic material dispersion to bitumen emulsion advantageously ranges from 0.5:1 to 4:1.

The plastic materials having the $T_{max}$ values indicated which are present in the connecting layer can be acrylic resins and/or pure acrylic resins, such as synthetic acrylic monomers and/or methacrylic monomers and/or acrylic resin copolymers and/or styrene.butadiene and/or polyvinyl acetate and/or polyvinyl propionate. The fillers are generally used in the form of round grain or split gravel.

The finely divided plastic materials optionally present in the connecting layer in addition to the plastic materials having low-temperature adhesiveness are those commercially available and conventionally employed in concretes and bitumina.

The connecting layer between cement-bound and/or bitumen-bound substrate and the concrete mixture previously described to be applied can be applied in a cold state, that is to say, in the liquid state at normal outdoor temperatures, particularly by injecting or spraying on. But it can also be applied in paste form, for instance by means of spreading or stripping machines.

It is of advantage to employ fillers of which at least a portion possesses thixotropic properties, such as for instance colloidal $SiO_2$, montmorillonite or bentonite or fibers such as asbestos.

The invention, as far as it relates to the concrete mixtures or mortar mixtures according to the invention, is described by means of the following test examples which are summarized in table form for easy reference.

EXAMPLES 1 to 19

Cement, plastic material(s) and optionally bitumen emulsion(s) were mixed in the amounts evident from the following table with the organic fibers (and hollow micro bodies) and inorganic aggregates in dry form (particle distribution according to Austrian Standard ÖN B 3304) in the amounts also given in the table in the compulsory mixer with the amount of water required for attaining the proper consistency for processing and sample bodies were made thereof.

Storage up to mechanical testing occurred under normal climatic conditions.

All concretes prepared from concrete mixtures containing plastic materials (and bitumen) and fibers (and hollow micro bodies were shown to possess, in addition to the improved properties as previously indicated, excellent modulus of elasticity values at low temperatures and excellent stability to frost-thaw and to the application of defrosting salt. Their resistance to attack by aggressive chemicals was extremely high.

In the following table, (x) means that additionally, 1.5 percent of a 60-% bitumen emulsion based on the fresh volumetric weight of the concrete mixture are employed, (xx) means that additionally, 10 percent of a 60% bitumen emulsion based on the fresh volumetric weight of the concrete mixture are employed and (xxx) means that hollow micro bodies of dimensions of 2 to 100 μm in amounts of 3.5 percent by volume based on the volume of the fresh concrete in the concrete mixture are employed.

The cement portion for the concretes in Examples 1 to 19 was selected, for the purposes of comparison, mainly as 400 kg/m³ of fresh concrete, but may be varied within the usual framework of concrete technology under retention of the advantages of the aggregates according to the invention.

TABLE I

| No. | Concrete kg/m³ fresh concr. | PLASTIC MATERIAL based on dry weight | | | value of water to concrete value | Type of processing of aggregates pulverizing or cutting mean length | | | fineness of fiber dtex | Volumetric weight kg/m³ | | pressure strength testing temp. after storage at +20° C. | | | ELASTICITY-MODULUS static/ kg/m² | type of concrete | flexural tensile strength kg/cm² |
|---|---|---|---|---|---|---|---|---|---|---|---|---|---|---|---|---|---|
| | | type | kg/m³ fresh concr. | $T_{max}$ value °C. DIN 53445 | | aggregates (filler) | in mm | amount kg/cm³ | | fresh | 28$^d$ | 2$^h$ | 7$^d$ | 28$^d$ | 28$^d$ | | 28$^d$ |
| 1 | 400 | — | — | — | 0,45 | — | — | — | — | 2448 | 2435 | 112 | 390 | 425 | 333.000 | C₁₁A₇CaF₂ | 74 |
| 2 | 400 | — | — | — | 0,45 | — | — | — | — | 2450 | 2438 | — | 300 | 406 | 324.000 | PZ 375 | 63 |
| 3 | 300 | acrylic resin | 40 | −45 | 0,42 | Perlon fiber | 32 | 2 | 2,8–22,0 | 2438 | 2430 | 80 | 163 | 205 | 158.000 | C₁₁A₇CaF₂ | 84 |
| 4 | 400 | acrylic resin | 40 | −45 | 0,42 | Dralon fiber | 12 | 4 | 2,2–17,0 | 2432 | 2429 | 81 | 198 | 226 | 168.000 | C₁₁A₇CaF₂ | 98 |
| 5 | 400 | styrene-butadiene | 60 | −70 | 0,45 | Polyester Trevira fiber | 4 | 8 | 1,3–19,0 | 2400 | 2384 | 44 | 120 | 198 | 90.000 | C₁₁A₇CaF₂ | 48 |
| 6 | 400 | vinylacetate-chloride Ethylene | 40 | −22 | 0,45 | sisal, cut filament | 0,25–0,75 | 6 | — | 2428 | 2418 | — | 232 | 312 | 180.000 | PZ 375-F flue ash concr. | 98 |
| 7 | 400 | acrylic acid butylester | 100 | −54 | 0,31 | cotton, cut filament | 0,40–0,90 | 10 | 3,0–6,0 | 2320 | 2300 | — | 90 | 120 | 46.000 | PZ 375 | 30 |
| 8 | 350 | acrylic propyl ester | 20 | −20 | 0,30 | polypropylen cut fiber | 4–10 | 9 | 2,8–17,0 | 2430 | 2421 | 91 | 312 | 342 | 220.000 | C₁₁A₇CaF₂ | 112 |
| 9 | 400 | styrene butadiene | 35 | −70 | 0,46 | nylon cut fiber | 6–10 | 5 | 5,6–6,7 | 2430 | 2421 | 69 | 170 | 212 | 180.000 | PZ 475 | 102 |
| 10 | 400 | acrylic acid ethyl ester | 40 | −8 | 0,45 | polyacryl cut filament | 10–15 | 4 | 2,2–6,7 | 2441 | 2436 | 100 | 358 | 400 | 290.000 | C₁₁A₇CaF₂ | 124 |
| 11 | 400 | acrylic acid | 15 | −45 | 0,44 | polyamide-"mahlflock" | 0,50–1 | 8 | 2,8–22,0 | 2445 | 2438 | 110 | 370 | 405 | 260.000 | C₁₁A₇CaF₂ | 138 |
| 12 | 400(x) | acrylic acid | 100 | −45 | 0,39 | polyester powdered | 0,50–0,75 | 2 | 2,2–6,7 | 2312 | 2300 | — | 112 | 125 | 38.000 | PZ 375 | 38 |
| 13 | 380(x) | acrylid acid | 60 | −45 | 0,42 | Cell wool | 14– | 5 | 1,7 | 2405 | 2390 | 38 | 168 | 188 | 68.000 | puzzolane concrete | 54 |
| 14 | 400(xx) | acrylic acid | 20 | −45 | 0,44 | polyacryl-nitrile cut fiber pulverized | 0,40–0,60 | 8 | 2,2–6,7 | 2300 | 2268 | — | 54 | 60 | 15.000 | EPZ 275 | 24 |
| 15 | 400(xxx) | acrylic acid | 30 | −45 | 0,43 | polyester cut filament | 9 | 12 | 2,2–6,7 | 2388 | 2368 | 68 | 144 | 199 | 152.000 | high alumina concrete | 64 |

TABLE II (no fibers and no microhollow bodies)

| No. | concrete kg/m³ fresh concrete | PLASTIC MATERIAL based on dry weight type | PLASTIC MATERIAL based on dry weight kg/m³ fresh concrete | $T_{max}$ value °C. DIN 53445 | value of water to concrete | volumetric weight kg/m³ fresh | volumetric weight kg/m³ $7^d$ | volumetric weight kg/m³ $28^d$ | pressure strength kp/cm² testing temp. after storage at +20° C. +20° C. $2^h$ | +20° C. $7^d$ | +20° C. $28^d$ | −15° C. $2^h$ | −15° C. $7^d$ | −15° C. $28^d$ | −36° C. $2^h$ | −36° C. $7^d$ | −36° C. $28^d$ |
|---|---|---|---|---|---|---|---|---|---|---|---|---|---|---|---|---|---|
| 16 | 400 | styrene-butadiene | 120 | −40 | 0,29 | 2240 | 2215 | 2200 | — | 48 | 78 | — | 47 | 81 | — | 46 | 84 |
| 17 | 150 | (1) styrene butadiene | 100 | −10 | 0.93 | 2314 | 2310 | 2298 | — | 32 | 38 | — | 38 | 42 | — | 42 | 54 |
| 18 | 150 | (1) + (2) styrene butadiene | 80 | −15 | 0,84 | 2212 | 2208 | 2200 | — | 21 | 26 | — | 22 | 28 | — | 24 | 27 |
| 19 | 150 | (2) pure acrylic resin | 70 | −25 | 0,86 | 2232 | 2228 | 2220 | — | 26 | 30 | — | 27 | 29 | — | 30 | 34 |

| No. | ELASTICITY MODULE/static/kp/cm² testing temp. after storage at +20° C. +20° C. $7^d$ | +20° C. $28^d$ | −15° C. $7^d$ | −15° C. $28^d$ | −36° C. $7^d$ | −36° C. $28^d$ | Number of frost-thaw periods under additional effect of shock and impact −15° C. | −36° C. | type of concrete |
|---|---|---|---|---|---|---|---|---|---|
| 16 | 38.000 | 41.000 | 38.000 | 40.000 | 39.000 | 42.000 | >50 | >50 | PZ 375 |
| 17 | 20.000 | 20.000 | 22.000 | 22.000 | 24.000 | 26.000 | >70 | >70 | PZ 375 |
| 18 | 10.000 | 12.000 | 11.000 | 12.000 | 12.000 | 14.000 | >70 | >70 | PZ 375 |
| 19 | 9.000 | 9.000 | 9.000 | 9.000 | 9.500 | 10.000 | >70 | >70 | PZ 375 |

(1) 40 kg polyethylene fibers/m³ fresh concrete
(2) 160 kg of 60% anionic bitumenemulsion/m³ fresh concrete The following explanatory remarks are made in connection with the Examples given in Table II:

EXAMPLE 16

The use of the styrene-butadiene dispersion having a $T_{max}$ value of −40° C. does not appreciably change the mechanical elasticity in the range up to −36° C. The mechanical strength at 20° C. corresponds to that of hard rubber. If hard mastic asphalt is cooled to −36° C., the modulus of elasticity increases to 150.000.

EXAMPLE 17

Even at relative increase of the portion of plastic material as compared to the hydraulic binder and as compared to the concretes of Example 16, concretes of a pronounced rubberlike behavior are obtained, their elasticity remains nearly constant up to a testing temperature of −36° C.

EXAMPLE 18

When adding additional bitumen emulsion to a styrene-butadiene dispersion having a $T_{max}$ value of −15° C., at reduced content in hydraulic binder, there is no detrimental change in elasticity behavior up to −36° C.

EXAMPLE 19

When replacing styrene-butadiene by the dispersion of a pure acrylic resin of even lower $T_{max}$ values, namely −25° C., rubber-like coatings having the properties indicated above are obtained.

EXAMPLES 20 to 22 and 23 to 25

(corresponding to Examples 7 and 8)

In further Examples, two concretes corresponding to those described in Examples 7 and 8 were prepared, but without the addition of fibers. No air entraining agents were added to the concretes of Examples 20 and 23. The concretes in Examples 21 and 24 contained air entraining agents which resulted in a content in air pores of 3.8 to 4.1 percent by volume. The concretes in Examples 22 and 25 contained 4 percent of synthetic hollow micro bodies of dimensions of up to about 100 μm.

The concretes not containing any air entraining agents (Examples 20 and 23) passed the test as to frost-thaw and defrosting salt stress in a satisfactory manner. The concretes of Examples 21 and 24 containing air entraining agents fully passed this test, but showed a slight loss of weight of the sample bodies. The concretes of Examples 22 and 25 containing hollow micro bodies showed the best results in the test as to frost-thawing by defrosting salt, the loss of weight of the sample bodies was no longer measurable. The appearance of these sample bodies (Examples 22 and 25) in regard to their surface was also most favorable.

Examples concerning the compound arrangement of concrete according to the invention and layer imparting adhesiveness:

In all the following Examples, the connecting layer was first applied to a bitumen-bound or cement-bound substrate, depending upon the desired shock and impact damping effect in a thickness of 0.2 to 8 mm measuring 0.1 to 4 m after drying. Within a period of time of up to one hour, the fresh concrete of the composition according to the invention was applied, compacted and stripped, or plates of this concrete were applied.

The dispersions or emulsions in all the Examples were of an aqueous nature.

EXAMPLE 26

To a concrete roadway surface consisting of ten-year-old, rough-surfaced and mechanically coarsely cleaned, cement-bound concrete of grade B 400, the following mixture was applied by spraying in order to prepare a connecting layer according to the invention:

1 part by weight of a 50 percent anionic bitumen emulsion, basis B 200, and one part by weight of a 50 percent acrylic resin dispersion of a $T_{max}$ value of about −46° C. determined by DIN 53445 in a layer thickness of 1 mm which corresponds to a dry film thickness of about 0.5 mm. The fresh concrete was applied to this connecting layer after 30 minutes. The fresh concrete partly consisted of modified, rapid-setting Portland cement in a weight ratio of 400 kg/m³ based on the finished concrete. The aggregates, if present, are evident from Table I or II as well as the water to concrete value (w/c value). The thickness of the layer of fresh concrete applied to the connecting layer (according to Example 3 in respect of fresh concrete) was 4 mm.

After a setting time of 12 hours, a square sample body of 50 cm edge length was cut out and stored under water at room temperature for 3 hours. After 3 hours, this plate was frozen to −40° C. for 4 hours. It was subsequently thawed in water of 50° C. during 2 hours. This extreme frost-thaw stress was repeated 20 times without the repair concrete peeling off the substrate. In addition, the sample plate was subjected to impact stress by rebounding with the Schmidt concrete testing hammer during all the frosting and thawing periods.

Control plates whose layers imparting adhesiveness only consisted of plastic material dispersions or mixtures with hydraulic binders at a ratio of 1:1 and reaction synthetic resins, either filled or unfilled, on epoxy resin basis, showed peeled spots even after the second frost-thaw change under the same conditions of impact stress.

The following Examples were carried out identical to Example 26, but with the exception that the structure of the substrate, the mixture for the connecting layer and the thickness of this layer in the dry state were varied.

In these Examples, as well, the products according to the invention withstood the heavy frost-thaw stress and simultaneous impact stress excellently.

EXAMPLE 27

Substrate: Old concrete roadway surface cleaned with water, thickness of the connecting layer in the dry state 0.5 mm.

Type of application of connecting layer: spraying.

Composition of the mixture for preparation of the connecting layer:

1 part by weight of a 50 percent anionic bitumen emulsion, basis B 65, and 0.2 parts by weight of a 50 percent styrene-butadiene dispersion having a $T_{max}$ value of −8.5° C.

Composition of the concrete applied as in Example 3; thickness 4 mm.

EXAMPLE 28

Substrate: concrete roadway surface.

Thickness of the connecting layer in the dry state: 0.1 mm.

Type of application of the connecting layer: spraying.

Composition of the mixture for preparation of the connecting layer:

1 part by weight of a 50 percent non-ionogenic bitumen emulsion, basis B 10, and 0.2 parts by weight of a 50 percent polyvinyl acetate dispersion of a $T_{max}$ value of −18° C.

Concrete mixture applied corresponding to Example 7, thickness 4 cm.

EXAMPLE 29

Substrate: bituminous supporting layer, maximum particle size 32 mm.

Thickness of the connecting layer in the dry state: 4 mm.

Type of application of connecting layer: spatula.

Composition of the mixture for preparation of the connecting layer:

1 part by weight of a 50 percent anionic bitumen emulsion, basis fluxed bitumen B 500, 0.5 parts by weight 50 percent acrylic resin- copolymer dispersion having a $T_{max}$ value of −10° C., 1 part by weight quartzitic filler 0 to 4 mm according to screen line and 0.5 parts by weight of cement.

Concrete mixture applied corresponding to Example 7, thickness 4 cm.

EXAMPLE 30

Substrate: bituminous supporting layer, maximum grain size 32 mm.

Thickness of the connecting layer in the dry state: 1 mm.

Type of application of the connecting layer: spraying.

Composition of the mixture for preparation of the connecting layer:

0.5 parts by weight of a 50 percent cationic bitumen emulsion, basis B 120, 1 part by weight of a 50 percent acrylic resin dispersion having a $T_{max}$ value of −46° C., 0.5 parts by weight of limestone filler and 0.5 parts by weight of hydraulic binder.

Concrete mixture applied corresponding to Example 8, thickness 4 cm.

EXAMPLE 31

Substrate: Concrete roadway surface damages by spike tires, coarsely cleaned.

Thickness of the connecting layer in the dry state: 2 mm.

Type of application of the connecting layer: spraying.

Composition of the mixture for preparation of the connecting layer:

1 part by weight of a 50 percent non-ionogenic bitumen emulsion on the basis of B 85, 0.2 parts by weight of a 50 percent acrylic resin dispersion having a $T_{max}$ value of −9° C. and 4 parts by weight sand of a particle distribution of 0–1 mm.

Concrete mixture applied corresponding to Example 10, thickness 4 cm.

EXAMPLE 32

Substrate: Concrete roadway surface coarsely cleaned with water.

Thickness of the connecting layer in the dry state: 3 mm.

Type of application of the connecting layer: spatula.

Composition of the mixture for preparation of the connecting layer:

0.9 parts by weight of a mixture consisting of equal parts of a 50 percent anionic bitumen emulsion, basis B 65 and basis B 120, 0.01 parts by weight 50 percent polyvinyl propionate dispersion having a $T_{max}$ value of −10° C. and 2 parts by weight filler of maximum particle size of 0–1 mm. Concrete mixture applied corresponding to Example 12, thickness 4 cm.

EXAMPLE 33

Substrate: bituminous supporting layer, maximum particle size 32 mm.

Thickness of the connecting layer in the dry state: 0.5 mm.

Type of application of the connecting layer: spraying.

Composition of the mixture for preparation of the connecting layer:

0.01 parts by weight of a 50 percent anionic bitumen emulsion, basis fluxed bitumen B 500, 1 part by weight of a 50 percent acrylic resin dispersion having a $T_{max}$ value of "46° C., and 0.5 parts by weight of cement and additionally, 0.1 part by weight water for achieving the desired consistency. Concrete mixture applied according to Example 6, thickness 4 cm.

EXAMPLE 34

Substrate: concrete roadway surface.

Thickness of the connecting layer in the dry state: 0.6 mm.

Type of application of the connecting layer: spatula.

Composition of the mixture for preparation of the connecting layer:

1 part by weight of a cationic bitumen emulsion, basis B 200, 1 part by weight of a mixture of 30 percent polyvinyl acetate dispersion having a $T_{max}$ value of −8.5° C. and 70 percent polyvinyl propionate dispersion having a $T_{max}$ value of −10° C., 1 part by weight filler of a particle size of 0 to 0.25 mm and 0.1 part by weight of cement.

The bitumen emulsion and the plastic material dispersion were 50 percent. Concrete mixture applied corresponding to Example 6, thickness 4 cm.

EXAMPLE 35

Substrate: Concrete roadway surface.

Thickness of the connecting layer in the dry state: 4 mm.

Type of application of the connecting layer: spatula.

Composition of the mixture for preparation of the connecting layer:

0.1 parts by weight of a 50 percent non-ionogenic bitumen emulsion, basis B 65, 0.1 parts by weight of a 50 percent acrylic resin dispersion having a $T_{max}$ value of −37° C., and 0.9 parts by weight of filler with a particle size of 0 to 3 mm.

Concrete mixture applied corresponding to Example 16, thickness 4 cm.

EXAMPLE 36

Substrate: bituminous asphalt fine concrete surface.

Thickness of the connecting layer in the dry state: 0.125 mm.

Type of application of the connecting layer: spatula.

Composition of the mixture for preparation of the connecting layer:

0.5 parts by weight of a 50 percent anionic bitumen emulsion, basis fluxed bitumen B 500, 0.5 parts by weight of a 50 percent acrylic resin dispersion having a $T_{max}$ value of −46° C. and 0.2 parts by weight asbestos fibers as filler. Concrete mixture applied corresponding to Example 18, thickness 4 cm.

EXAMPLE 37

Substrate: Concrete roadway surface.

Thickness of the connecting layer in the dry state: 1 mm.

Type of application of the connectioning layer: spatula.

Composition of the mixture for preparation of the connecting layer:

0.2 parts by weight of a 50 percent cationic bitumen emulsion, basis B 200, 0.8 parts by weight of a 50 percent acrylic resin copolymer dispersion having a $T_{max}$ value of −16° C. and 1.2 parts by weight of filler with a particle size of 0 to 0.25 mm. Concrete mixture applied corresponding to Example 14, thickness 4 cm.

As previously indicated, the invention is valuable not only for the repair of roadway surfaces, but also for newly applying on bridges and indoor floors, such as workshops, and generally for connecting fresh concrete with a cement-bound or bitumen-bound substrate intended for this particular purpose.

EXAMPLE 38

A connecting layer of a thickness in the dry state of 1.2 mm was sprayed onto a substrate consisting of a reinforced concrete bridge supporting structure cleaned with water, the spraying being affected according to the airless spraying process. The mixture for preparation of the connecting layer was of the following composition:

1 part by weight of a 60 percent pure acrylic resin dispersion having a $T_{max}$ value of −36° C. and 0.3 parts by weight of a commercially available, anionic, 50 percent bitumen emulsion. 0.2 parts by weight of cement, 0.3 parts by weight of limestone meal and 0.4 parts by weight of quartz granules of a particle size of 0.5 to 1.2 mm were used as fillers. The composition of the concrete applied to this substrate corresponding to Example 13, thickness of the layer was 6 cm.

Even under heavy stress due to heavy traffic, and after intensive scattering of defrosting salt (NaCl) during two winters under air temperatures of −22° C. minimum, no peeling off from the supporting structure and particularly no signs of corrosion of the supporting structure were observed.

EXAMPLE 39

The substrate was formed of a concrete layer onto which a connecting layer or layer imparting adhesiveness was sprayed in a thickness in the dry state of 0.5 mm. The composition of the mixture for preparation of the layer imparting adhesiveness was the following: 1 part by weight of a 50 percent pure acrylic resin dispersion having a $T_{max}$ value of −40° C. and 0.2 parts by weight of a non-ionogenic, 50 percent bitumen emulsion on the basis B 45.

The concrete mixture applied was "Leca" concrete (lightweight concrete) with a binder content of 350 kg, a maximum particle size of 12 mm and a volumetric weight of 1600 kg/m$^3$ of fresh concrete (FC) in a layer thickness of 5 cm.

This concrete combination, as well, showed excellent stability down to very low outside temperatures at equal stress.

EXAMPLE 40

In a plant for producing prefabricated parts, a sandwich plate consisting of conventional concrete (cement content 300 kg/m$^3$ FC) in a layer thickness of 10 cm and a particle size of the aggregate of 0 to 16 mm was prepared. Onto this concrete layer, a layer imparting adhesiveness of a composition corresponding to Example 38 was applied in a thickness of 0.7 mm (calculated for the dry state). Onto the layer imparting adhesiveness, an EPS concrete (expanded polystyrene concrete) was applied in a layer having a thickness of 4 cm. Cement content 250 kg/m$^3$ FC and 70 kg acrylic resin dispersion having a $T_{max}$ value of −45° C. The sandwich plate thus produced possessed excellent properties in respect of the strength required for this purpose as well as, above all, heat and sound insulation.

EXAMPLE 41

The same plate as described in Example 40 was prepared, the layer imparting adhesiveness was applied in a thickness of 0.5 mm and was of the following composition:

1 part by weight of a 50 percent anionic bitumen emulsion, basis B 65, and 0.2 parts by weight of a 50 percent styrene-butadiene dispersion having a $T_{max}$ value of $-8,5°$ C. was sprayed on. This sandwich plate showed particularly good properties.

What is claimed is:

1. A concrete or mortar mixture or concrete or mortar on the basis of hydraulic binders and plastic materials for the production of building elements or coatings insensitive to shock and impact stress, abrasion, frost-thaw and defrosting salt and chemical attack as well as for effecting repair work on building elements or coatings, wherein lime or cement selected from the group consisting of Portland cement of conventional composition, iron Portland cement, blast furnace cement, flue ash Portland cement, Ciment composé, puzzolane cement, high-alumina cement, modified Portland cement on the basis of $11CaO.7Al_2O_3$. $CaF_2$, Brunauer cement, Grenoble cement and Roman cement and further at least one liquid-dispersed or dissolved plastic material consisting essentially of a polymer of an ethylemically unsaturated monomer, said plastic material having low-temperature adhesiveness and a $T_{max}$ value of less than $-8°$ C. determined according to DIN 53445 are contained.

2. A concrete or mortar mixture or concrete or mortar according to claim 1, wherein said plastic material has a $T_{max}$ value of less than $-15°$ C. determined according to DIN 53445.

3. A concrete or mortar mixture or concrete or mortar according to claim 2, wherein said plastic material has a $T_{max}$ value of less than $-36°$ C. determined according to DIN 53445.

4. A concrete or mortar mixture according to claim 1 or 2, wherein said plastic material is employed in amounts of 2 to 75 percent by weight each based on the amount of inorganic binder.

5. A concrete or mortar mixture according to claim 1 or 2, wherein said plastic material is employed in amounts of 3 to 35 percent by weight each based on the amount of inorganic binder.

6. A concrete or mortar mixture according to claim 1 or 2, wherein said plastic material is employed in amounts of 5 to 20 percent by weight each based on the amount of inorganic binder.

7. A concrete or mortar mixture according to claim 1 or 2, wherein said plastic material employed is selected from the group consisting of pure acrylic resins from synthetic acrylic monomers, pure acrylic resins from synthetic methacrylic monomers, acrylic resin copolymers, styrene-butadiene, polyvinyl ester and mixtures thereof, wherein cationic moieties of said acrylic resins are selected from the group consisting of ester and acid moieties.

8. A concrete or mortar mixture of concrete or mortar on the basis of hydraulic binders and plastic materials for the production of building elements or coatings insensitive to shock and impact stress, abrasion, frost-thaw and defrosting salt and chemical attack as well as for effecting repair work on building elements or coatings, wherein lime or cement selected from the group of Portland cement of conventional composition, iron Portland cement, blast furnace cement, flue ash Portland cement, Ciment composé, puzzolane cement, high-alumina cement, modified Portland cement on the basis of $11CaO.7Al_2O_3$. $CaF_2$, Brunauer cement, Grenoble cement and Roman cement and further at least one liquid-dispersed or dissolved plastic material consisting essentially of a polymer of an ethylemically unsaturated monomer having low-temperature adhesiveness and a $T_{max}$ value of less than $-8°$ C. determined by DIN 53445 and, in addition to said components bitumen or tar in ground, dry-dispersed, liquid-dispersed or dissolved form are contained.

9. A concrete or mortar mixture according to claim 8, wherein bitumen or tar are employed in amounts of 0.5 to 65 percent by weight, preferably 0.5 to 25 percent by weight, based on the amount of inorganic binder.

10. A concrete or mortar mixture according to claim 8, wherein bitumen or tar are employed in amounts of 0.5 to 10 percent by weight based on the amount of inorganic binder.

11. A concrete or mortar mixture according to claim 8, wherein bitumen or tar are employed in amounts of 1 to 6 percent by weight based on the amount of inorganic binder.

12. A concrete or mortar mixture according to claim 8 or 9, wherein said plastic material employed has a $T_{max}$ value of less than $-15°$ C. determined according to DIN 53445.

13. A concrete or mortar mixture according to claim 8 or 9, wherein said plastic material employed has a $T_{max}$ value of less than $-36°$ C. determined according to DIN 53445.

14. A concrete or mortar mixture according to claim 8 or 9, wherein said plastic material employed is selected from the group consisting of pure acrylic resins from synthetic acrylic monomers, pure acrylic resins from synthetic methacrylic monomers, acrylic resin copolymers, styrene-butadiene, polyvinyl ester and mixtures thereof, wherein cationic moieties of said acrylic resins are selected from the group consisting of ester and acid moieties.

15. A concrete or mortar mixture or concrete or mortar, on the basis of hydraulic binders and plastic materials for the production of building elements or coatings insensitive to shock and impact stress, abrasion, frost-thaw and defrosting salt and chemical attack as well as for effecting repair work on building elements or coatings, wherein lime or cement selected from the group consisting of Portland cement of conventional composition, iron Portland cement, blast furnace cement, flue ash Portland cement, Ciment compose, puzzolane cement, high-alumina cement, modified Portland cement on the basis of $11CaO.7Al_2O_3$. $CaF_2$, Brunauer cement, Grenoble cement and Roman cement, further at least one liquid-dispersed or dissolved plastic material consisting essentially of a polymer of an ethylemically unsaturated monomer, and plastic material having low-temperature adhesiveness and a $T_{max}$ value of less than $-8°$ C. determined by DIN 53445 and, in addition to said components, aggregates are contained, with 0 to 100 percent by weight of said aggregates consisting of particles or form bodies of organic material, which the respective remaining portion consists of conventional aggregates.

16. A concrete or mortar mixture according to claim 15, wherein the form bodies of organic material are natural fibers or fibers of synthetic plastic material having a thickness of 1 to 100 μm and a length of 0.2 to 50 mm.

17. A concrete or mortar mixture according to claim 15, wherein the form bodies of organic material are natural fibers or fibers of synthetic plastic material having a thickness of 2 to 70 μm and a length of 0.4 to 35 mm.

18. A concrete or mortar mixture or concrete or mortar according to claim 15, wherein the fibers are selected from the group consisting of cotton, cell wool, sisal, polyamide, polyacryl nitrile, polyesters, polyvinyl acetate, polyvinyl propionate, polyvinyl chloride, styrene-butadiene resins, polystyrene, polyurethane, methacrylic acid esters, acrylic resins and acrylic copolymers and are present in the form of fiber powders, cut filaments or fibers, short staple fibers, fabric chips, felt chips or grinding flock.

19. A concrete or mortar mixture according to claim 16 or 18, wherein the fibers are present in amounts of 0.2 to 35 percent by weight based on the amount of inorganic substances of the binder.

20. A concrete or mortar mixture according to claim 16 or 18, wherein the fibers are present in amounts of 1 to 25 percent by weight based on the amount of inorganic substances of the binder.

21. A concrete or mortar mixture according to claim 16 or 18, wherein the fibers are present in amounts of 2 to 10 percent by weight based on the amount of inorganic substances of the binder.

22. A concrete or mortar mixture according to claim 16 or 18, wherein in addition to hydraulic binders said, plastic materials having a $T_{max}$ value of less than $-8°$ C. and said fibers, bitumen or tar in amounts of 0.5 to 65 percent by weight based on the amount of inorganic substances of the binder are contained.

23. A concrete or mortar mixture according to claim 15, wherein the plastic material employed has a $T_{max}$ value of less than $-15°$ C. determined by DIN 53445.

24. A concrete or mortar mixture according to claim 15, wherein the plastic material employed has a $T_{max}$ value of less than $-36°$ C. determined by DIN 53445.

25. A concrete or mortar mixture according to claim 15, wherein the plastic material employed is selected from the group consisting of acrylic resins, pure acrylic resins such as synthetic acrylic monomers or methacrylic monomers, acrylic resin copolymers, styrene-butadiene, polyvinyl acetate, polyvinyl propionate and mixtures thereof and wherein the plastic material is contained in amounts of 2 to 75 percent by weight each based on the amount of inorganic binder substances.

26. A process for the production of a concrete or mortar mixture or concrete or mortar, wherein lime or cement selected from the group consisting of Portland cement of conventional composition, iron Portland cement, blast furnace cement, flue ash Portland cement, Ciment compose, puzzolane cement, high-alumina cement, modified Portland cement on the basis of 11CaO.-7Al$_2$O$_3$.CaF$_2$, Brunauer cement, Grenoble cement and Roman cement and further at least one liquid-dispersed or dissolved plastic material having low-temperature adhesiveness and a $T_{max}$ value of less than $-8°$ C. determined by DIN 53445 and, in addition to said components, aggregates are contained, 0 to 100 percent by weight of said aggregates consisting of particles or form bodies or organic material, while the remaining portion consists of conventional aggregates, wherein the aggregates including the form bodies of organic material are first mixed with 30 to 70 percent by weight of the plastic material consisting essentially of a polymer of an ethylemically unsaturated monomer having a $T_{max}$ value of less than $-8°$ C. present in dissolved or dispersed form and are covered by this in the course of mixing, that after this, the entire amount of inorganic hydraulic binder is added and finally, the respective remaining portion of the plastic material and the desired amount of water are added.

27. A process for the production of a concrete or mortar mixture or concrete or mortar, wherein lime or cement selected from the group consisting of Portland cement of conventional composition, iron Portland cement, blast furnace cement, flue ash Portland cement, Ciment compose, puzzolane cement, high-alumina cement, modified Portland cement on the basis of 11CaO.-7Al$_2$O$_3$.CaF$_2$, Brunauer cement, Grenoble cement and Roman cement, bitumen or tar and further at least one liquid-dispersed or dissolved plastic material consisting essentially of a polymer of an ethylemically unsaturated monomer having low-temperature adhesiveness and a $T_{max}$ value of less than $-8°$ C. determined by DIN 53445 and, in addition to said component, aggregates are contained, wherein the aggregates including form bodies of organic material are mixed with 30 to 100 percent by weight of the bitumen or tar employed and further with 30 to 70 percent by weight of the plastic material present in liquid-dispersed or dissolved form, that subsequently the entire amount of inorganic binder substances is added and finally, the respective remaining portion of bitumen or tar and the desired amount of water are added.

28. A process for the production of a concrete or mortar mixture or concrete or mortar, wherein lime or cement selected from the group consisting of Portland cement of conventional composition, iron Portland cement, blast furnace cement, flue ash Portland cement, Ciment compose, puzzolane cement, high-alumina cement, modified Portland cement on the basis of 11CaO.-7Al$_2$O$_3$.CaF$_2$, Brunauer cement, Grenoble cement, Roman cement, bitumen or tar and further at least one liquid-dispersed or dissolved plastic material consisting essentially of a polymer of an ethylemically unsaturated monomer having low-temperature adhesiveness and a $T_{max}$ value of less than $-8°$ C. determined by DIN 53445 and, in addition to said components, aggregates in the form of organic form bodies and inorganic aggregates ate contained, wherein only a portion of the form bodies of organic material and at least a portion of the inorganic aggregates provided is mixed with 30 to 70 percent by weight of the plastic material present in dissolved or dispersed form and 30 to 100 percent by weight of the bitumen or tar, that subsequently, the entire amount of inorganic binder substances and the remaining portion of the organic form bodies and the remainder of the inorganic aggregates present are added and that finally, the remaining portion of bitumen or tar and the desired amount of water are added.

29. A concrete or mortar mixture according to any one of claims 1, 2, 8, 9, or 15, wherein said plastic material is selected from the group consisting of butadiene resins, polyvinyl acetate, polyvinyl chloride, polyvinyl propionate, vinylacetate chloride/ethylene copolymer, acrylic acid butylester, acrylic acid propyl ester, acrylic acid ethyl ester, and mixtures thereof.

* * * * *